United States Patent [19]
Bennett et al.

[11] 4,428,470
[45] Jan. 31, 1984

[54] ELECTROMAGNETIC CLUTCH

[75] Inventors: George T. Bennett, Kettering; J. D. Livesay, Tipp City, both of Ohio

[73] Assignee: General Motors Corporation, Detroit, Mich.

[21] Appl. No.: 284,384

[22] Filed: Jul. 17, 1981

[51] Int. Cl.³ ............................................. F16D 27/00
[52] U.S. Cl. .................................. 192/84 C; 335/297
[58] Field of Search ........................... 192/84 C, 84 B; 188/161; 335/297

[56] References Cited

U.S. PATENT DOCUMENTS

| | | | |
|---|---|---|---|
| 2,796,962 | 6/1957 | Pierce | 192/84 C |
| 3,044,594 | 7/1962 | Bernard . | |
| 3,055,475 | 9/1962 | Pitts | 192/84 C |
| 3,082,933 | 3/1963 | Bernard . | |
| 3,205,989 | 9/1965 | Mantey | 192/84 C |
| 3,325,760 | 6/1967 | Bernard | 192/84 C |
| 3,484,816 | 12/1969 | Davidson | 192/84 C |
| 3,719,260 | 3/1973 | Heidorn | 192/84 C |
| 3,724,621 | 4/1973 | Heidorn | 192/84 C |
| 4,122,930 | 10/1978 | Bennett et al. | 192/84 C |

*Primary Examiner*—Gary L. Smith
*Assistant Examiner*—Lloyd A. Gall
*Attorney, Agent, or Firm*—R. L. Phillips

[57] ABSTRACT

An electromagnetic clutch having a bearing supported pulley provided with a compact rotor, coil and coil housing arrangement having precisely controlled and maximized air gap areas with the compactness characterized by allowing the inner diameter of the pulley to approach the outer diameter of the coil and the precise controlling and maximizing of the air gap areas characterized by the formation of a close tolerance radial air gap at substantially the outer diameter of the bearing.

3 Claims, 2 Drawing Figures

ELECTROMAGNETIC CLUTCH

This invention relates to an electromagnetic clutch and more particularly to an improvement in the rotor, coil and coil housing thereof for compacting the electromagnetic clutch and precisely controlling and maximizing air gap areas thereof.

The present invention is in an electromagnetic clutch adapted for use in a confined compartment on a device having a rotatable shaft surrounded by a bearing support, a bearing surrounding and supported by the bearing support in a fixed location, a rotor including a pulley rotatably mounted on the bearing and located thereby and provided with a clutch element of magnetic material, a cooperating clutch element of magnetic material operably connected to the shaft, and electromagnetic means including a coil associated with the clutch element on the rotor for attracting the clutch element on the shaft and a coil housing cooperating with the rotor for containing the coil and forming a magnetic flux path. The present invention is directed to improvement in the rotor, coil and coil housing for compacting the electromagnetic clutch and precisely controlling and maximizing air gap areas thereof. This is accomplished in the preferred embodiment by the rotor and coil housing comprising opposed annular members surrounding the bearing support and defined by radially inner and outer walls which telescope in air gap defining relationship with each other to form an axial elongated cavity therebetween. The coil is defined as a cylinder contiguous with the radially outer wall of the coil housing but spaced from the radially inner wall thereof and axially longer than the coil housing to project therefrom into the cavity unsupported at the pulley so that the inner diameter of the pulley can be reduced to compact the clutch by approaching the outer diameter of the coil. The radially inner wall of the rotor is made axially longer than the bearing to project from the bearing at substantially the outer diameter thereof into the space formed between the coil and the radially inner wall of the coil housing to precisely control air gaps between both said inner and outer walls where they telescope with each other and to form a radial air gap of maximum area with the radially inner wall of the coil housing by reason of the circumference of the inner rotor wall being substantially the same as the outer diameter of the bearing. Moreover, an axial air gap is formed between a radial wall of the coil housing and the radially inner wall of the rotor to add to the magnetic flux path between the rotor and the coil housing adjacent its inner diameter.

These and other objects, advantages and features of the present invention will become more apparent from the following description and drawing in which.

Figure 1:
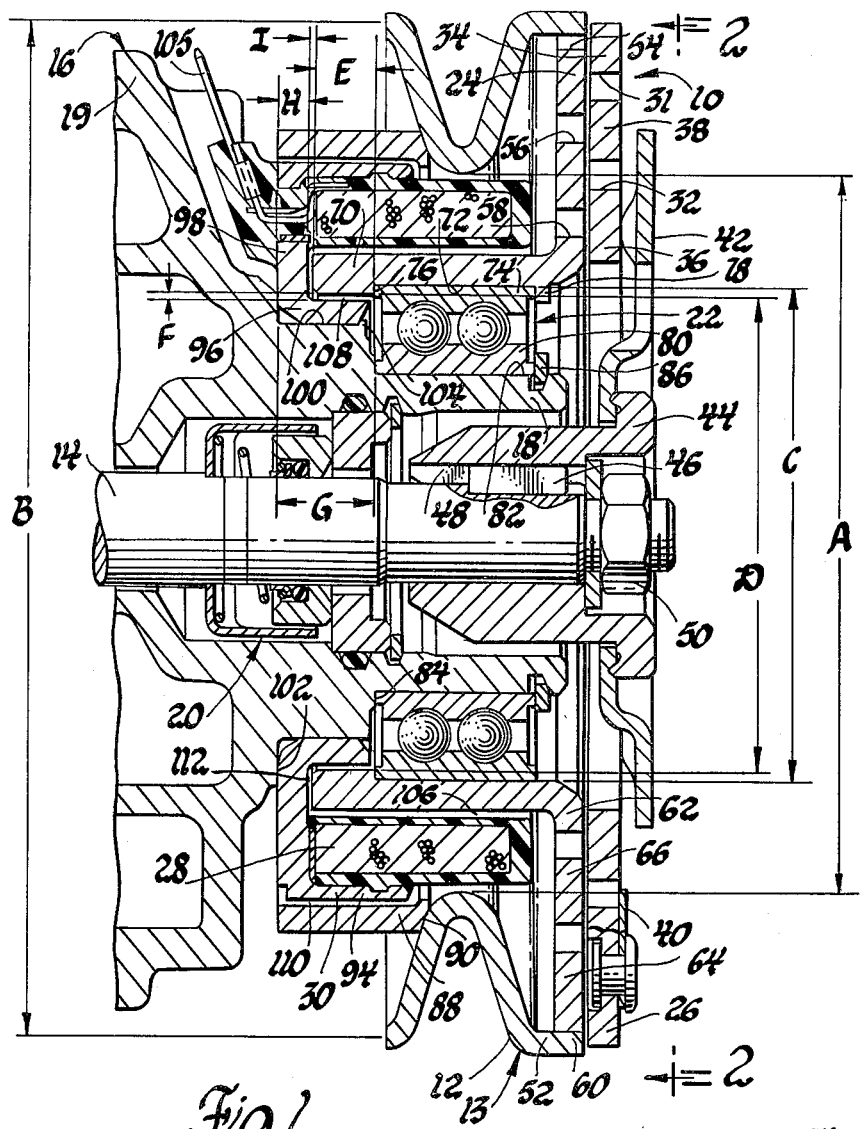
FIG. 1 is a longitudinal sectional view of an electromagnetic clutch constructed according to the present invention.

Referring to the drawing, there is shown an electromagnetic clutch 10 including a pulley 12 which is adapted to be clutched to the drive shaft 14 of a refrigerant compressor 16 (only a portion of which is shown). The compressor is of a conventional type used in vehicles with the shaft 14 rotatably supported therein and adapted to be driven by the vehicle's engine (not shown) on engagement of the clutch 10 with belt drive from the engine to the pulley 12. The shaft 14 extends through a tubular extension 18 formed on one of the compressor heads 19 for connection with the clutch and is sealed within the tubular extension by a rotary seal arrangement 20.

The electromagnetic clutch 10 is especially adapted for use in a confined compartment or space such as a vehicle engine compartment and on a device such as the refrigerant compressor 16 whose tubular extension 18 is adaptive to serve as a bearing support for the clutch. The clutch bearing in this case is a double-row ball bearing 22 which surrounds and is supported by the bearing support 18 in a fixed location. The pulley 12 forms part of the clutch rotor 13 which is rotatably mounted on the bearing and is located thereby and is provided with a clutch element 24 of magnetic material. A cooperating clutch element 26 also of magnetic material is operably connected to the shaft 14 and is engaged with the rotor's clutch element 24 by electromagnetic means including a coil 28 which is associated with the clutch element 24 on the rotor for attracting the clutch element 26 on the shaft 14 and a coil housing 30 cooperating with the rotor for containing the coil and forming a magnetic flux path.

Figure 2:
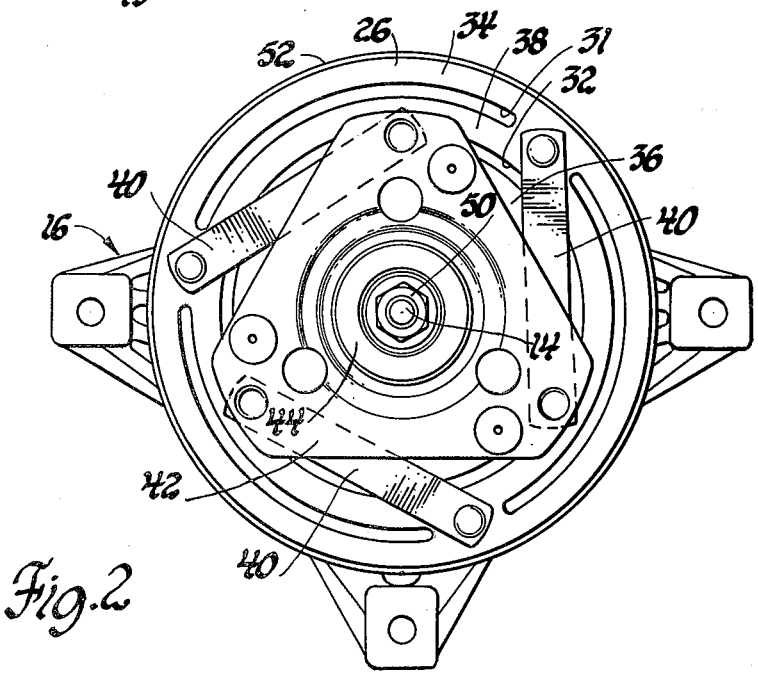
FIG. 2 is a view taken along the line 2—2 in FIG. 1 but reduced in size.

Describing now the various details of the electromagnetic clutch and particularly the improvement in the rotor, coil and coil housing for compacting the clutch and precisely controlling and maximizing the air gap areas thereof, the clutch element 26 is an annular plate having two radially spaced annular rows of slots 31 and 32 which form three distinct concentric annular pole rings; namely a radially outer pole ring 34, a radially inner pole ring 36 and an intermediate pole ring 38 (see FIGS. 1 and 2). The clutch element 26 is riveted to one end of three leaf springs 40 which are riveted at their other or opposite end to a drive plate 42 of generally triangular shape, the leaf springs being chordally arranged and equally annularly spaced about the drive shaft axis. The drive plate 42 is welded at its inner diameter to a hub 44 which is fixed by a cooperating key 46 and slot 48 and a nut 50 to the projecting end of the compressor drive shaft 14.

The other clutch element 24 which is a part of the rotor 13 is welded at its outer perimeter to the inner diameter of a cylindrical flange 52 which is formed integral with the pulley 12 and extends rightwardly therefrom as shown in FIG. 1. The clutch element 24 has three radially spaced annular rows of arcuate slots 54, 56 and 58 similar to those in the clutch element 26 but at different or offset radial locations so as to provide with the edge of flange 52 four bridging concentric annular pole rings; namely a radially outer pole ring 60, a radially inner pole ring 62 and two intermediate pole rings 64, 66. The pole rings on the clutch elements 24 and 26 are thus located relative to each other in a bridging relationship as shown in FIG. 1 so as to provide a 6-pole flux path and resultantly high clutch torque capacity on their magnetic engagement.

The rotor's clutch element 24 is additionally formed with a cylindrical inner wall 70 having a stepped bore 72 in which the outer race 74 of the bearing 22 is press-fitted against the step 76 of the bore and further retained therein by stakings 78 in the bore at the outer edge of the race. The inner race 80 of the bearing, on the other hand, is press-fitted on a stepped outer cylindrical section 82 of the tubular extension 18 and is retained against the step 84 thereon by a snap ring 86. The rotor 13, in addition, includes a cylindrical ring 88 which is welded at its right-hand end 90 as shown in FIG. 1 to the pulley 12 near the latter's inner diameter, the cylindrical ring 88 together with the pulley 12 and the clutch element 24 including the cylindrical section 70 thus defining annular rotor walls which are generally U-shaped in section and include radially outer and inner annular walls, i.e. 88 and 70.

The coil housing 30 similarly has radially outer and inner annular walls 94 and 96 which in this case are joined by an integral radial wall 98. The inner coil housing wall 96 is press-fitted at its inner diameter on a stepped cylindrical section 100 of the extension or bearing support 18 radially outward of and adjacent the concentric smaller diameter section 82. Moreover, the coil housing 30 is located and retained against a step 102 on the bearing support by stakings 104.

The rotor and coil housing are thus formed with opposed annular members 88, 94 and 70, 96 which surround the bearing support 18 and which telescope in air gap defining relationship with each other to form an axially elongated cavity 106 therebetween and inside the pulley 12.

The coil 28 has a cylindrical configuration with an external terminal 105 and is potted in the coil housing 30 contiguous with the radially outer wall 94 thereof but spaced from the radially inner wall 96 and is axially longer than the coil housing to project therefrom into the cavity 106 unsupported at the pulley. As a result, the inner diameter of the pulley can be reduced as shown to compact the clutch by approaching the outer diameter of the coil 28. The radially inner wall 70 of the rotor is axially longer than the bearing 74 at its outer race so as to project from its mounting on the bearing at substantially the outer diameter thereof into the space formed between the coil 28 and the radially inner wall 96 of the coil housing to precisely control the inner and outer radial air gaps 108 and 110 between both the inner and outer walls 70, 96 and 88, 94 where they telescope with each other and to form the inner radial air gap 108 of maximum area with the radially inner wall 96 of the coil housing by reason of the circumference of the inner rotor wall 70 being substantially the same as the outer diameter of the bearing. Moreover, with the projection of the inner wall 70 of the rotor, there is formed an axial air gap 112 of substantial area between the radial wall 98 of the coil housing and the end of the radially inner wall 70 of the rotor and thus added flux path area between the coil housing and rotor adjacent the bearing.

The rotor 13, coil 28 and coil housing 30 arrangement thus compacts the electromagnetic clutch and in addition, precisely controls and maximizes the air gap areas thereof. For example, in an actual construction of the electromagnetic clutch shown and described above, a highly reliable compact unit with precisely controlled and maximized air gap area was obtained with the inner diameter A of the pulley 12 reduced to 3.541" resulting in a reduced mean belt diameter B at the pulley of 4.930" while the outer diameter C of the bearing 22 was maintained at 2.440". To this end, the inner diameter D of the radially inner rotor wall 70 at the inner radial air gap 108 was made of only slightly lesser diameter than the outer bearing diameter and measured between 2.3307" and 2.3281" to thus provide a 0.052" average bearing stop radial heighth at the step 76 on the rotor with the radial rotor thickness over the bearing (i.e. that of the inner rotor wall 70) then sized to carry the required magnetic flux without high resistance. By keeping the rotor stop for use as a bearing stop to the minimum, this allows the largest circumference possible at the inner radial air gap 108. This large circumference times the length E of the inner rotor wall 70 behind the bearing gives a large area for the magnetic flux to cross over the inner radial air gap 108 from the rotating rotor to the stationary coil housing 30 at the inner coil housing wall 96. This air gap whose dimension is F has close tolerance because there are only two diameters that control it and thus close control on the length of path that the flux must jump from the rotating rotor to the stationary coil housing and was set at 0.0073" to 0.0110" so that it carries the majority of the magnetic flux. On the other hand, the dimension G determines the bearing stop to coil housing stop distance while the dimension H denotes the thickness of the coil housing's radial wall 98 leaving the dimension E which is the length of the rotor's inner radial wall past the bearing to determine the dimension I of the axial air gap 112. The remainder of the magnetic flux was made to jump from the rear of the rotor to the inside of the coil housing across the axial air gap 112 by then varying its dimension I from 0.038" to 0.005". The outer radial air gap 110 on the other hand, is at such a large diameter as compared to both the radially inwardly located air gaps 108 and 112 that sufficient flux path area is obtained across the axial length of rotor ring 88 at approximately the inner diameter of the pulley and with a relatively large magnetic flux jump of 0.010" to 0.015".

The above described preferred embodiment is illustrative of the invention which may be modified within the scope of the appended claims.

The embodiments of the invention in which an exclusive property or privilege is claimed are defined as follows:

1. In an electromagnetic clutch for use in a confined compartment on a device having a rotatable shaft surrounded by a bearing support, a bearing surrounding and supported by said bearing support in a fixed location, a rotor including a pulley rotatably mounted on said bearing and located thereby and provided with a clutch element of magnetic material, a cooperating clutch element of magnetic material operably connected to said shaft, electromagnetic means including a coil associated with the clutch element on said rotor for attracting the clutch element on said shaft and a coil housing cooperating with said rotor for containing said coil and forming a magnetic flux path, the improvement in said rotor, coil and coil housing for compacting the electromagnetic clutch and precisely controlling and maximizing air gap areas thereof, said rotor and said coil housing comprising opposed annular members surrounding said bearing support and defined by radially inner and outer walls which telescope in air gap defining relationship with each other and additionally form an axially elongated cavity therebetween extending between the inner diameter of said pulley and the inner wall of said rotor, said coil defined as a cylinder contiguous with the radially outer wall of said coil housing but spaced from the radially inner wall thereof and axially longer than both the inner and outer wall of said coil housing to project therefrom into said cavity unsupported at said pulley so that the inner diameter of said pulley can be reduced to compact the clutch by approaching the outer diameter of said coil, the inner wall of said rotor being axially longer than said bearing to project from its mounting on said bearing at substantially the outer diameter thereof into the space formed between said coil and the inner wall of said coil housing to precisely control the air gaps between both said inner and outer walls where they telescope with each other and to form a radial air gap of maximum area with the inner wall of said coil housing by reason of the diameter of said inner rotor wall being substantially the same as the outer diameter of said bearing.

2. In an electromagnetic clutch for use in a confined compartment on a device having a rotatable shaft surrounded by a bearing support, a bearing surrounding and supported by said bearing support in a fixed location, a rotor including a pulley rotatably mounted on said bearing and located thereby and provided with a clutch element of magnetic material, a cooperating clutch element of magnetic material operably connected to said shaft, electromagnetic means including a coil associated with the clutch element on said rotor for attracting the clutch element on said shaft and a coil housing cooperating with said rotor for containing said coil and forming a magnetic flux path, the improvement in said rotor, coil and coil housing for compacting the electromagnetic clutch and precisely controlling and maximizing air gap areas thereof, said rotor and said coil housing comprising opposed annular members surrounding said bearing support and defined by radially inner and outer walls which telescope in air gap defining relationship with each other and additionally form an axially elongated cavity therebetween extending between the inner diameter of said pulley and the inner wall of said rotor, said coil defined as a cylinder contiguous with the outer wall of said coil housing but spaced from the inner wall thereof and axially longer than both the inner and outer wall of said coil housing to project therefrom into said cavity unsupported at said pulley so that the inner diameter of said pulley can be reduced to compact the clutch by approaching the outer diameter of said coil, the inner wall of said rotor being axially longer than said bearing to project from its mounting on said bearing at substantially the outer diameter thereof into the space formed between said coil and the inner wall of said coil housing to precisely control the air gaps between both said inner and outer walls where they telescope with each other and to form a radial air gap of maximum area with the inner wall of said coil housing by reason of the diameter of said inner rotor wall being substantially the same as the outer diameter of said bearing and to additionally form an axial air gap between a radial wall of said coil housing and the inner wall of said rotor.

3. In an electromagnetic clutch for use in a confined compartment on a device having a rotatable shaft surrounded by a bearing support, a bearing surrounding and supported by said bearing support in a fixed location, a rotor including a pulley rotatably mounted on said bearing and located thereby and provided with a clutch element of magnetic material, a cooperating clutch element of magnetic material operably connected to said shaft, electromagnetic means including a coil associated with the clutch element on said rotor for attracting the clutch element on said shaft and a coil housing cooperating with said rotor for containing said coil and forming a magnetic flux path, the improvement in said rotor, coil and coil housing for compacting the electromagnetic clutch and precisely controlling and maximizing air gap areas thereof, said rotor and said coil housing comprising opposed annular members surrounding said bearing support and defined by walls generally U-shaped in section which telescope in radially inner and outer radial air gap defining relationship with each other and additionally form an axially elongated cavity therebetween extending between the inner diameter of said pulley and the inner wall of said rotor, said coil defined as a cylinder contiguous with the outer wall of said coil housing but spaced from the inner wall thereof and axially longer than both the inner and outer wall of said coil housing to project therefrom into said cavity unsupported at said pulley so that the inner diameter of said pulley can be reduced to compact the clutch by approaching the outer diameter of said coil, the inner wall of said rotor being axially longer than said bearing to project from its mounting on said bearing at substantially the outer diameter thereof into the space formed between said coil and the inner wall of said coil housing to precisely control the air gaps between both said inner and outer walls where they telescope with each other and to form said inner radial air gap of maximum area with the radially inner wall of said coil housing by reason of the diameter of said inner rotor wall being substantially the same as the outer diameter of said bearing.

* * * * *